(12) United States Patent
Hong et al.

(10) Patent No.: US 12,118,983 B2
(45) Date of Patent: Oct. 15, 2024

(54) ELECTRONIC DEVICE AND OPERATION METHOD THEREOF

(71) Applicant: SAMSUNG ELECTRONICS CO., LTD., Suwon-si (KR)

(72) Inventors: Yeona Hong, Suwon-si (KR); Jungwook Park, Suwon-si (KR); Minseok Kwon, Suwon-si (KR); Jungin Lee, Suwon-si (KR); Seokyeong Jung, Suwon-si (KR); Gajin Song, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 17/711,420

(22) Filed: Apr. 1, 2022

(65) Prior Publication Data
US 2022/0319497 A1    Oct. 6, 2022

Related U.S. Application Data

(63) Continuation of application No. PCT/KR2022/004321, filed on Mar. 28, 2022.

(30) Foreign Application Priority Data

Apr. 2, 2021  (KR) .......................... 10-2021-0043522

(51) Int. Cl.
*G10L 15/06*   (2013.01)
*G06F 40/268*  (2020.01)
(Continued)

(52) U.S. Cl.
CPC .......... *G10L 15/063* (2013.01); *G06F 40/268* (2020.01); *G10L 15/07* (2013.01); *G10L 15/183* (2013.01)

(58) Field of Classification Search
CPC ..... G10L 15/063; G10L 15/07; G10L 15/183; G06F 40/268; G06F 40/30; G06F 40/216; G06F 40/279
See application file for complete search history.

(56) References Cited

U.S. PATENT DOCUMENTS 9,344,878 B2    5/2016  Kang et al.
9,747,895 B1 *  8/2017  Jansche ................. G10L 15/183
(Continued)

FOREIGN PATENT DOCUMENTS

JP    2006-209353    8/2006
JP    2008-287210    11/2008
(Continued)

OTHER PUBLICATIONS

Search Report and Written Opinion issued Jul. 6, 2022 in counterpart International Patent Application No. PCT/KR2022/004321.

*Primary Examiner* — Bhavesh M Mehta
*Assistant Examiner* — Darioush Agahi
(74) *Attorney, Agent, or Firm* — Nixon & Vanderhye P.C.

(57) ABSTRACT

Disclosed is an electronic device. The electronic device includes: a processor, and a memory operatively connected to the processor, the memory stores instructions that, when executed, cause the processor to: select at least one data received through a user input, analyze the selected data, extract additional data based on the analyzed data, learn a personal voice model using the data and the additional data, and provide response data using the personal voice model.

12 Claims, 15 Drawing Sheets

(51) Int. Cl.
  *G10L 15/07* (2013.01)
  *G10L 15/183* (2013.01)

(56) References Cited

U.S. PATENT DOCUMENTS

| | | |
|---|---|---|
| 9,842,588 B2 | 12/2017 | Kim et al. |
| 10,147,429 B2 | 12/2018 | Guevara et al. |
| 10,460,735 B2 | 10/2019 | Guevara et al. |
| 11,355,102 B1* | 6/2022 | Mishchenko ......... G10L 15/063 |
| 11,398,238 B2 | 7/2022 | Kim et al. |
| 2010/0306139 A1* | 12/2010 | Wu ....................... G06F 40/295 |
| | | 706/59 |
| 2016/0019896 A1 | 1/2016 | Alvarez Guevara et al. |
| 2017/0061957 A1 | 3/2017 | Ding et al. |
| 2018/0121419 A1* | 5/2018 | Lee ......................... G06F 40/56 |
| 2018/0330279 A1* | 11/2018 | Iwakura ................ G06N 20/00 |
| 2021/0233517 A1* | 7/2021 | Gong ...................... G10L 15/16 |
| 2021/0303939 A1* | 9/2021 | Hu ......................... G06V 10/25 |
| 2023/0095124 A1* | 3/2023 | Kawai ................ G06Q 30/0283 |
| | | 704/244 |
| 2023/0237769 A1* | 7/2023 | Li ........................ G06V 10/763 |
| | | 382/159 |

FOREIGN PATENT DOCUMENTS

| | | |
|---|---|---|
| JP | 2009-075582 | 4/2009 |
| JP | 2014-052427 | 3/2014 |
| JP | 2017-045054 | 3/2017 |
| JP | 2020-008637 | 1/2020 |
| KR | 10-2013-0125057 | 11/2013 |
| KR | 10-2016-0010961 | 1/2016 |
| KR | 10-2017-0043955 | 4/2017 |
| WO | 2014/035394 | 3/2014 |
| WO | 2020/246649 | 12/2020 |

* cited by examiner

| SPEECH | PART-OF-SPEECH |
|---|---|
| SUBSTANTIVE | NOUN, PRONOUN, AND NUMERAL |
| MODIFIER | DETERMINER AND ADVERB |
| POSTPOSITION | AUXILIARY WORD |
| INTERJECTION | EXCLAMATION |
| PREDICATE | VERB AND ADJECTIVE |

FIG.9

'IN NATIONAL ASSEMBLY, GOVERNMENT AND RULING PARTY HELD REAL ESTATE MARKET ISSUE CHECKING MEETING AND ANNOUNCED THAT THEY WOULD COME UP WITH ADDITIONAL MEASURES NEXT WEEK.' ~1001

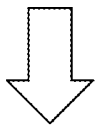

'NATIONAL ASSEMBLY', (1011)
'GOVERNMENT', (1012)
'RULING PARTY', (1013)
'REAL ESTATE', (1014)
'REAL ESTATE MARKET', (1015)
'REAL ESTATE MARKET STATUS', (1016)
'ADDITIONAL MEASURES' (1017)

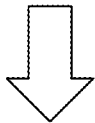

'CHAIRMAN OF NATIONAL ASSEMBLY', (1021)
'NATIONAL ASSEMBLY COMPOSITION RATIO', (1022)
'DEMOCRATIC PARTY OF KOREA', (1023)
'TRADE TREND', (1024)
'REAL ESTATE MARKET PRICE', (1025)
'MINISTER OF LAND, INFRASTRUCTURE AND TRANSPORT' (1026)

FIG.10

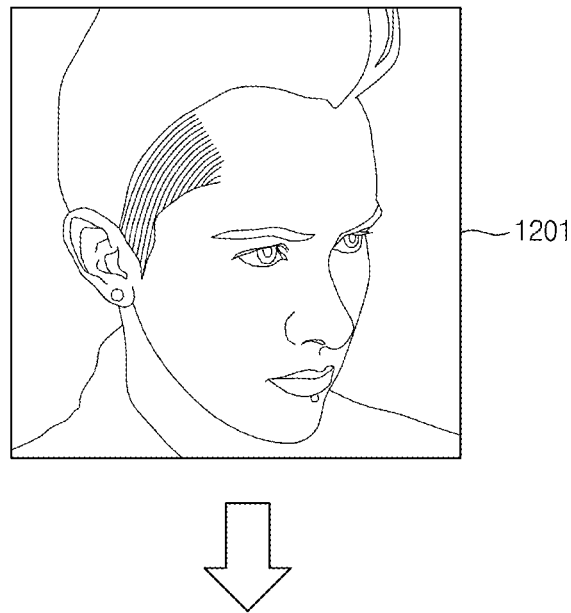
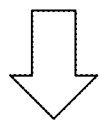
'ALBUM NAME' (1211)
'SINGER NAME' (1212)
'SONG RECORDED IN ALBUM' (1213)
'ANOTHER ALBUM OF SAME PERIOD' (1221)
'DIFFERENT SONG BY SAME SINGER' (1222)
'DIFFERENT SONG FEATURED BY SAME SINGER' (1223)
FIG.12

ELECTRONIC DEVICE AND OPERATION METHOD THEREOF

CROSS-REFERENCE TO RELATED APPLICATIONS

This application is a continuation of International Application No. PCT/KR2022/004321 designating the United States, filed on Mar. 28, 2022, in the Korean Intellectual Property Receiving Office and claiming priority to Korean Patent Application No. 10-2021-0043522, filed on Apr. 2, 2021, in the Korean Intellectual Property Office, the disclosures of which are incorporated by reference herein in their entireties.

BACKGROUND

Field

The disclosure relates to an electronic device and an operation method of the electronic device.

Description of Related Art

Recently, with a development of an artificial intelligence (AI) technology, a terminal including the AI used for a main purpose of an assistant is becoming common. In addition, recent electronic devices may support various input schemes such as a voice input in addition to a traditional input scheme using a keyboard or a mouse. For example, the electronic device such as a smart phone or a tablet provides a service that receives a voice of a user and executes an operation corresponding to the inputted voice of the user.

Such a voice recognition service is being developed based on a technology for processing a natural language. The technology for processing the natural language is a technology that provides a service to the user by identifying an intention of a user input (an utterance) and calculating a result that matches the intention. Accordingly, the users are naturally giving various commands to or having a dialog with the AI included in the terminal.

Accordingly, a need for a voice assistant optimized for the user is increasing.

SUMMARY

Embodiments of the disclosure provide a method and a device for providing a personalized voice model.

Embodiments of the disclosure provide a method and a device for providing a personalized voice model by analyzing information extracted based on a user input.

Embodiments of the disclosure provide a method and a device for providing a personalized voice model by extracting additional information based on the analyzed information.

Embodiments of the disclosure provide a method and a device for providing a consistent user experience to a user by providing a personalized voice model based on the added information even when the user directly adds information.

An electronic device according to an example embodiment of the disclosure includes: a processor, and a memory operatively connected to the processor, wherein the memory stores instructions that, when executed, cause the processor to: select at least one data received through a user input, analyze the selected data, extract additional data based on the analyzed data, learn a personal voice model using the data and the additional data, and provide response data using the personal voice model.

A method performed by an electronic device according to an example embodiment of the disclosure includes: selecting at least one data received through a user input based on a process for a memory included in the electronic device or connected to the electronic device being executed, analyzing the selected data, extracting additional data based on the analyzed data, learning a personal voice model using the data and the additional data, and providing response data using the personal voice model.

According to various example embodiments of the disclosure, the method and the device for providing the personalized voice model may be provided.

According to various example embodiments of the disclosure, the method and the device for providing the personalized voice model by analyzing the information extracted based on the user input may be provided.

According to various example embodiments of the disclosure, the method and the device for providing the personalized voice model by extracting the additional information based on the analyzed information may be provided.

According to various example embodiments of the disclosure, the personalized voice model may be provided based on the added information even when the user directly adds the information.

In addition, various effects that are directly or indirectly identified through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 9 is a diagram illustrating an example method for analyzing extracted information according to various embodiments;

FIG. 10 is a diagram illustrating an example method for analyzing extracted information and extracting additional information, according to various embodiments;

FIG. 12 is a diagram illustrating an example method for analyzing extracted image information and extracting additional information, according to various embodiments;

In connection with the description of the drawings, the same or similar reference numerals may be used for the same or similar components.

DETAILED DESCRIPTION

Hereinafter, various example embodiments of the disclosure will be described with reference to the accompanying drawings. However, this is not intended to limit the disclosure to specific embodiments, and it should be understood to include various modifications, equivalents, and/or alternatives of embodiments of the disclosure.

Figure 1:
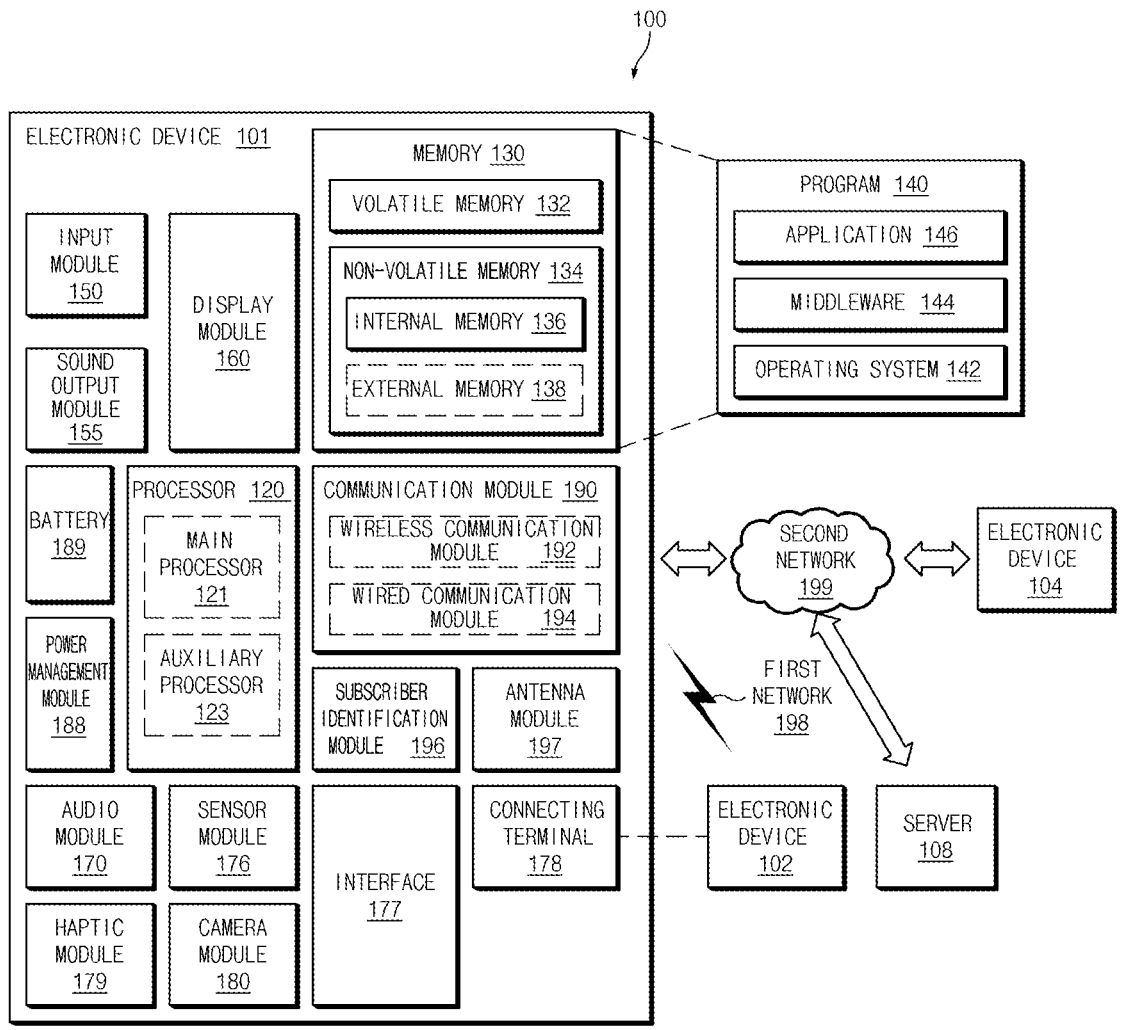
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
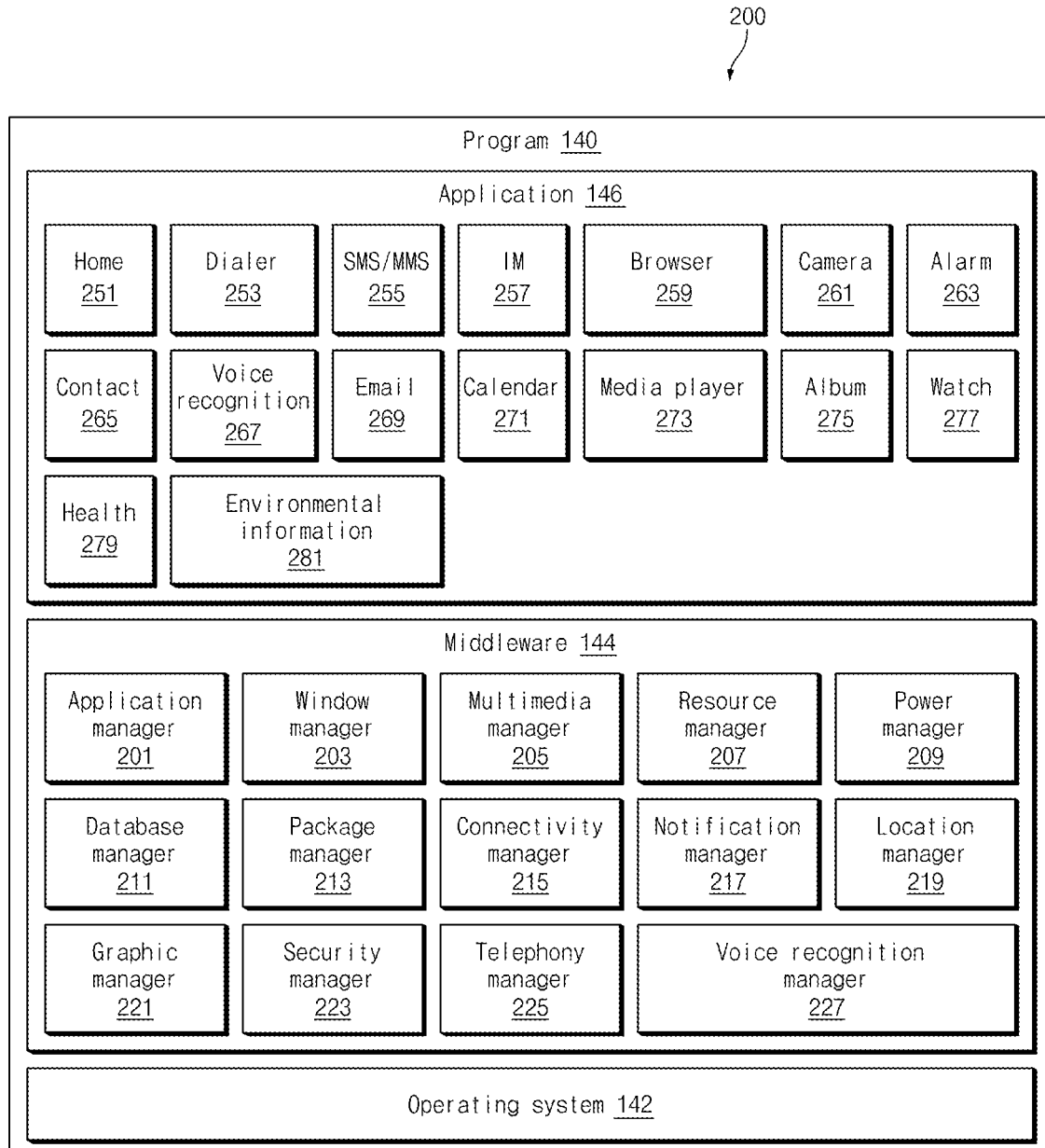
FIG. 2 is a block diagram illustrating an example program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, and without limitation, Android™, iOS™, Windows™, Symbian™, Tizen™, Bath™, or the like. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
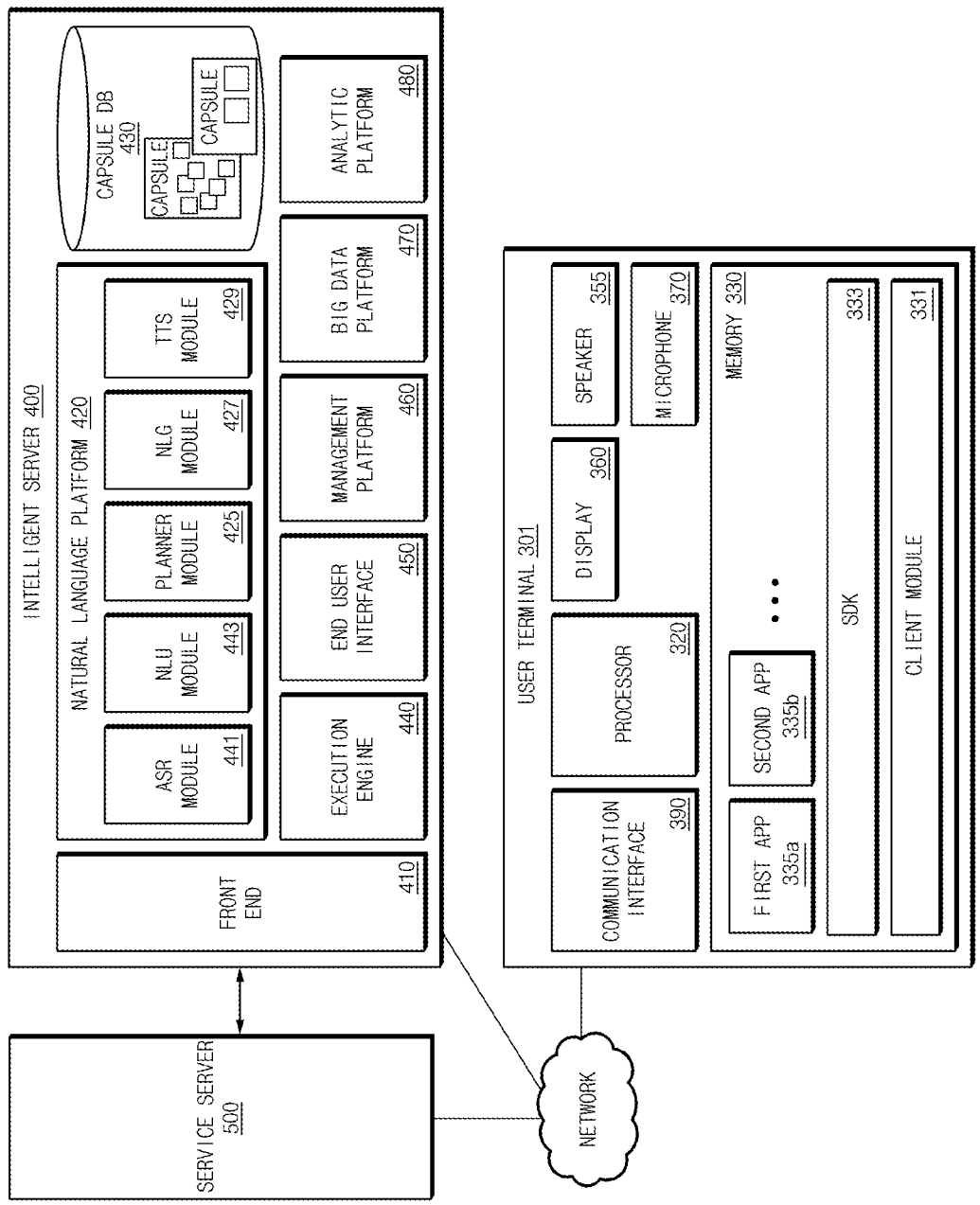
FIG. 3 is a block diagram illustrating an example configuration of an integrated intelligence system according to various embodiments.

FIG. 3 is a block diagram illustrating an example configuration of an integrated intelligence system according to various embodiments.

Referring to FIG. 3, the integrated intelligence system of an embodiment may include a user terminal 301, an intelligent server 400, and a service server 500.

The user terminal 301 of an embodiment may be a terminal device (or an electronic device) connectable to the Internet, and may be, for example, a mobile phone, a smart phone, a personal digital assistant (PDA), a laptop computer, a television (TV), white goods, a wearable device, a head mounted device (HMD), or a smart speaker.

According to the illustrated embodiment, the user terminal 301 may include a communication interface 390, a microphone 370, a speaker 355, a display 360, a memory 330, or a processor 320. The components listed above may be operatively or electrically connected to each other.

The communication interface 390 of an embodiment may be configured to transmit and receive data in connection with an external device. The microphone 370 of an embodiment may receive a sound (e.g., a user utterance) and convert the sound into an electrical signal. The speaker 355 of an embodiment may output the electrical signal as a sound (e.g., a voice). The display 360 of an embodiment may be configured to display an image or a video. The display 360 of an embodiment may also display a graphic user interface (GUI) of an app (or an application program) that is executed.

The memory 330 of an embodiment may store a client module 331, a software development kit (SDK) 333, and a plurality of apps 335. The client module 331 and the SDK 333 may include a framework (or a solution program) for performing a general function. In addition, the client module 331 or the SDK 333 may include a framework for processing a voice input.

The plurality of apps 335 may be a program for performing a specified function. According to an embodiment, the plurality of apps 335 may include a first app 335a and/or a second app 335b. According to an embodiment, each of the plurality of apps 335 may include a plurality of operations for performing the specified function. For example, the apps may include an alarm app, a message app, and/or a schedule app. According to an embodiment, the plurality of apps 335 may be executed by the processor 320 to sequentially execute at least some of the plurality of operations.

The processor 320 of an embodiment may control overall operations of the user terminal 301. For example, the processor 320 may be electrically connected to the communication interface 390, the microphone 370, the speaker 355, and the display 360 to perform a specified operation. For example, the processor 320 may include at least one processor.

The processor 320 of an embodiment may also execute a program stored in the memory 330 to perform a specified function. For example, the processor 320 may execute at least one of the client module 331 or the SDK 333 to perform a following operation for processing the voice input. The processor 320 may control the operations of the plurality of apps 335 through, for example, the SDK 333. Following operations described as operations of the client module 331 or the SDK 333 may be operations performed by execution of the processor 320.

The client module 331 of an embodiment may receive the voice input. For example, the client module 331 may receive a voice signal corresponding to the user utterance sensed through the microphone 370. The client module 331 may transmit the received voice input (e.g., the voice signal) to the intelligent server 400. The client module 331 may transmit state information of the user terminal 301 to the intelligent server 400 together with the received voice input. The state information may be, for example, execution state information of an app.

The client module 331 of an embodiment may receive a result corresponding to the received voice input. For example, when the intelligent server 400 is able to calculate the result corresponding to the received voice input, the client module 331 may receive the result corresponding to the received voice input. The client module 331 may display the received result on the display 360.

The client module 331 of an embodiment may receive a plan corresponding to the received voice input. The client module 331 may display results of executing a plurality of operations of an app based on the plan on the display 360. The client module 331 may, for example, sequentially display the execution results of the plurality of operations on the display. The user terminal 301 may, for another example, display only some (e.g., a result of a last operation) of the results of executing the plurality of operations on the display.

According to an embodiment, the client module 331 may receive a request for obtaining information required to calculate the result corresponding to the voice input from the intelligent server 400. According to an embodiment, the client module 331 may transmit the required information to the intelligent server 400 in response to the request.

The client module 331 of an embodiment may transmit result information of executing the plurality of operations based on the plan to the intelligent server 400. The intelligent server 400 may identify that the received voice input is correctly processed using the result information.

The client module 331 of an embodiment may include a voice recognition module. According to an embodiment, the client module 331 may recognize a voice input performing a limited function through the voice recognition module. For example, the client module 331 may execute an intelligent app for processing the voice input by performing an organic operation in response to a specified voice input (e.g., wake up!).

The intelligent server 400 of an embodiment may receive information related to a user voice input from the user terminal 301 through a communication network. According to an embodiment, the intelligent server 400 may change data related to the received voice input into text data. According to an embodiment, the intelligent server 400 may generate at least one plan for performing a task corresponding to the user voice input based on the text data.

According to an embodiment, the plan may be generated by an artificial intelligence (AI) system. The artificial intelligence system may be a rule-based system, or a neural network-based system (e.g., a feedforward neural network (FNN), and/or a recurrent neural network (RNN)). The artificial intelligence system may be a combination of the systems described above or another artificial intelligence system. According to an embodiment, the plan may be selected from a set of predefined plans, or may be generated in real time in response to a user request. For example, the artificial intelligence system may select at least one plan among the plurality of predefined plans.

The intelligent server 400 of an embodiment may transmit a result based on the generated plan to the user terminal 301, or transmit the generated plan to the user terminal 301. According to an embodiment, the user terminal 301 may display the result based on the plan on the display. According to an embodiment, the user terminal 301 may display a result of executing an operation based on the plan on the display.

The intelligent server 400 of an embodiment may include a front end 410, a natural language platform 420, a capsule database 430, an execution engine 440, an end user interface 450, a management platform 460, a big data platform 470, or an analytic platform 480.

The front end 410 of an embodiment may receive the voice input received from the user terminal 301. The front end 410 may transmit a response corresponding to the voice input to the user terminal 300.

According to an embodiment, the natural language platform 420 may include an automatic speech recognition module (ASR module) 441, a natural language understanding module (NLU module) 443, a planner module 425, a natural language generator module (NLG module) 427, and/or a text to speech module (TTS module) 429. Each of the various modules, platforms, engines interfaces, or the like, may include various processing circuitry and/or executable program instructions.

The automatic speech recognition module 441 of an embodiment may convert the voice input received from the user terminal 301 into the text data. The natural language understanding module 443 of an embodiment may identify an intention of the user using the text data of the voice input. For example, the natural language understanding module 443 may identify the intention of the user by performing syntactic analysis or semantic analysis.

The natural language understanding module 443 of an embodiment may identify a meaning of a word extracted from the voice input using linguistic features (e.g., grammatical elements) of a morpheme or a phrase, and determine the intention of the user by matching the identified meaning of the word with the intention.

The planner module 425 of an embodiment may generate the plan using the intention determined in the natural language understanding module 443 and a parameter. According to an embodiment, the planner module 425 may determine a plurality of domains required to perform the task based on the determined intention. The planner module 425 may determine a plurality of actions included in each of the plurality of domains determined based on the intention. According to an embodiment, the planner module 425 may determine a parameter required for executing the determined plurality of actions or a result value output by the execution of the plurality of actions. The parameter and the result value may be defined as a concept of a specified format (or class). Accordingly, the plan may contain a plurality of actions and/or a plurality of concepts determined by the intention of the user. The planner module 425 may determine a relationship between the plurality of actions and the plurality of concepts in stages (or hierarchically). For example, the planner module 425 may determine an execution order of the plurality of actions determined on the basis of the intention of the user based on the plurality of concepts. In other words, the planner module 425 may determine the execution order of the plurality of actions based on the parameter required for the execution of the plurality of actions and the result output by the execution of the plurality of actions. Accordingly, the planner module 425 may generate a plan containing association information (e.g., ontology) between the plurality of actions and the plurality of concepts. The planner module 425 may generate the plan using information stored in the capsule database 430 in which a set of relationships between the concepts and the actions is stored.

The natural language generator module 427 of an embodiment may change specified information into a text form. The information changed into the text form may be in a form of a natural language utterance. The text to speech module 429 of an embodiment may change the information in the text form into information in a voice form.

According to an embodiment, some functions or all functions of the functions of the natural language platform 420 may be implementable even in the user terminal 301.

The capsule database 430 may store information on the relationship between the plurality of concepts and actions corresponding to the plurality of domains. A capsule according to an embodiment may contain a plurality of action objects (or action information) and concept objects (or concept information) contained in the plan. According to an embodiment, the capsule database 430 may store a plurality of capsules in a form of a CAN (concept action network). According to an embodiment, the plurality of capsules may be stored in a function registry included in the capsule database 430.

The capsule database 430 may include a strategy registry in which strategy information required when determining the plan corresponding to the voice input is stored. The strategy information may include reference information for determining one plan when there are a plurality of plans corresponding to the voice input. According to an embodiment, the capsule database 430 may include a follow up registry in which information of a follow up operation for suggesting the follow up operation to the user in a specified situation is stored. The follow up operation may include, for example, a follow up utterance. According to an embodiment, the capsule database 430 may include a layout registry that stores layout information of information output through the user terminal 301. According to an embodiment, the capsule database 430 may include a vocabulary registry in which vocabulary information included in capsule information is stored. According to an embodiment, the capsule database 430 may include a dialog registry in which information of a dialog (or an interaction) with the user is stored. The capsule database 430 may update the stored object through a developer tool. The developer tool may include, for example, a function editor for updating the action object or the concept object. The developer tool may include a vocabulary editor for updating a vocabulary. The developer tool may include a strategy editor that creates and registers a strategy for determining the plan. The developer tool may include a dialog editor that creates the dialog with the user. The developer tool may include a follow up editor that may activate a follow up goal and edit the follow up utterance that provides a hint. The follow up goal may be determined based on a currently set goal, a preference of the user, or an environmental condition. In an embodiment, the capsule database 430 may be implemented in the user terminal 301 as well.

The execution engine 440 of an embodiment may calculate the result using the generated plan. The end user interface 450 may transmit the calculated result to the user terminal 301. Accordingly, the user terminal 300 may receive the result and provide the received result to the user. The management platform 460 of an embodiment may manage the information used in the intelligent server 400. The big data platform 470 of an embodiment may collect data of the user. The analytic platform 480 of an embodiment may manage a quality of service (QoS) of the intelligent server 400. For example, the analytic platform 480 may manage the components and a processing speed (or an efficiency) of the intelligent server 400.

The service server 500 of an embodiment may provide a specified service (e.g., food order or hotel reservation) to the user terminal 301. According to an embodiment, the service server 500 may be a server operated by a third party. The service server 500 of an embodiment may provide information for generating the plan corresponding to the received voice input to the intelligent server 400. The provided information may be stored in the capsule database 430. In addition, the service server 500 may provide result information based on the plan to the intelligent server 400.

In the integrated intelligence system described above, the user terminal 300 may provide various intelligent services to the user in response to a user input. The user input may include, for example, an input through a physical button, a touch input, or the voice input.

In an embodiment, the user terminal 301 may provide a voice recognition service through an intelligent app (or, a voice recognition app) stored therein. In this case, for example, the user terminal 301 may recognize the user utterance or the voice input received through the microphone, and provide a service corresponding to the recognized voice input to the user.

In an embodiment, the user terminal 301 may perform the specified operation, alone or together with the intelligent server and/or the service server, based on the received voice input. For example, the user terminal 301 may execute an app corresponding to the received voice input and perform the specified operation through the executed app.

In an embodiment, when the user terminal 301 provides the service together with the intelligent server 400 and/or the service server, the user terminal may sense the user utterance using the microphone 370, and generate a signal (or voice data) corresponding to the sensed user utterance. The user terminal may transmit the voice data to the intelligent server 400 using the communication interface 390.

The intelligent server 400 according to an embodiment may generate the plan for performing the task corresponding to the voice input or the result of performing the operation based on the plan as the response to the voice input received from the user terminal 301. The plan may contain, for example, a plurality of actions for performing the task corresponding to the voice input of the user and/or a plurality of concepts related to the plurality of actions. The concept may be obtained by defining a parameter input to the execution of the plurality of actions or a result value output by the execution of the plurality of actions. The plan may contain association information between the plurality of actions and/or the plurality of concepts.

The user terminal 301 of an embodiment may receive the response using the communication interface 390. The user terminal 301 may output the voice signal generated inside the user terminal 301 to the outside using the speaker 355, or may output an image generated inside the user terminal 301 to the outside using the display 360.

Figure 4:
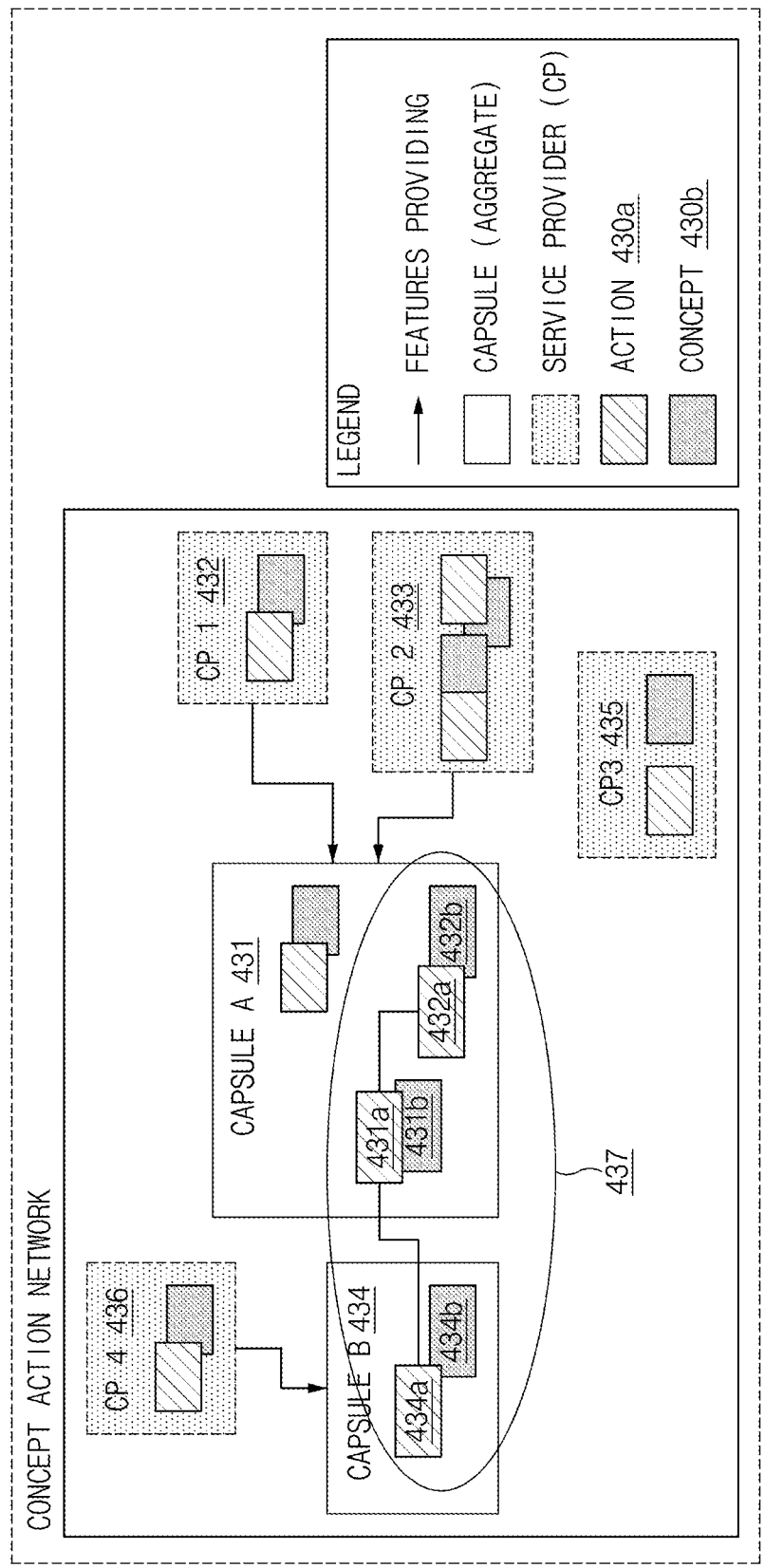
FIG. 4 is a diagram illustrating an example configuration in which relationship information between a concept and an action is stored in a database, according to various embodiments.

FIG. 4 is a diagram illustrating an example configuration of relationship information between a concept and an action stored in a database, according to various embodiments.

A capsule database (e.g., the capsule database 430) of the intelligent server 400 may store the capsule in the form of the concept action network (CAN). The capsule database may store an operation for processing the task corresponding to the voice input of the user, and a parameter required for the operation in the form of the concept action network (CAN).

The capsule database may store a plurality of capsules (a capsule A 431 and a capsule B 434) respectively corresponding to the plurality of domains (e.g., the applications). According to an embodiment, one capsule (e.g., the capsule A 431) may correspond to one domain (e.g., a location (geo) and the application). In addition, at least one service provider (e.g., a CP 1 432, a CP 2 433, a CP 3 435, or a CP 4 436) for performing a function for the domain related to the capsule may correspond to one capsule. According to an embodiment, one capsule may contain at least one action 430a and at least one concept 430b for performing a specified function.

The natural language platform 420 may generate the plan for performing the task corresponding to the received voice input using the capsule stored in the capsule database. For example, the planner module 425 of the natural language platform may generate the plan using the capsule stored in the capsule database. For example, a plan 437 may be generated using actions 431a and 432a and concepts 431b and 432b of the capsule A 431 and an action 434a and a concept 434b of the capsule B 434.

Figure 5:
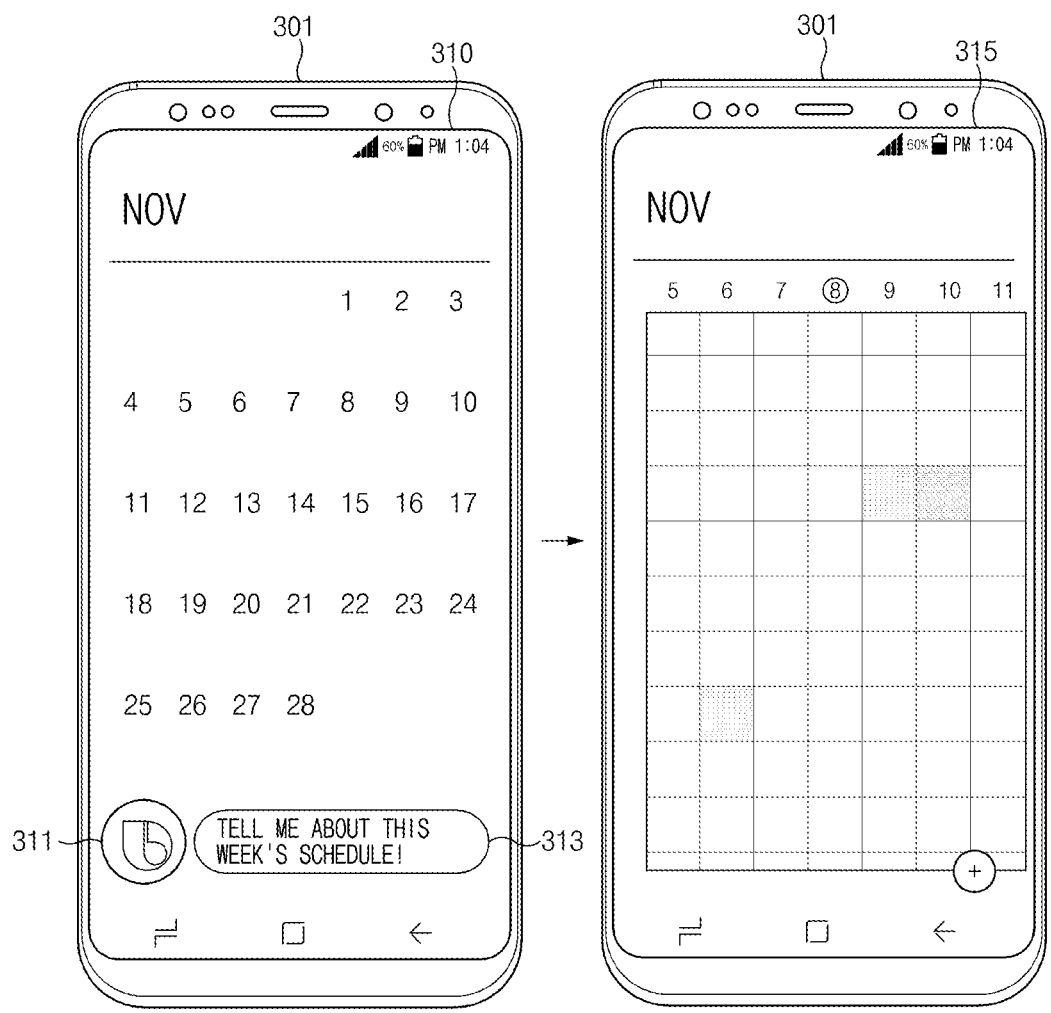
FIG. 5 is a diagram illustrating a user terminal displaying an example screen for processing a voice input received through an intelligent app according to various embodiments.

FIG. 5 is a diagram illustrating an example screen for processing, by a user terminal, a voice input received through an intelligent app according to various embodiments.

The user terminal 301 may execute the intelligent app to process the user input through the intelligent server 400.

According to an embodiment, on a screen 310, the user terminal 301 may execute the intelligent app for processing the voice input when recognizing the specified voice input (e.g., wake up!) or receiving an input through a hardware key (e.g., a dedicated hardware key). The user terminal 301 may, for example, execute the intelligent app while the schedule app is being executed. According to an embodiment, the user terminal 301 may display an object (e.g., an icon) 311 corresponding to the intelligent app on the display 360. According to an embodiment, the user terminal 300 may receive the voice input by the user utterance. For example, the user terminal 301 may receive a voice input saying "Tell me about this week's schedule!" According to an embodiment, the user terminal 301 may display, on the display, a user interface (UI) 313 (e.g., an input window) of the intelligent app in which the text data of the received voice input is displayed.

According to an embodiment, on a screen 315, the user terminal 301 may display the result corresponding to the received voice input on the display. For example, the user terminal 301 may receive the plan corresponding to the received user input, and display 'this week's schedule' on the display based on the plan.

In an embodiment, the user terminal 301 in FIGS. 3, 4, and 5 may correspond to the electronic device 101 in FIG. 1. In an embodiment, the intelligent server 400 in FIG. 3 may correspond to one of the electronic device 104 and the server 108 in FIG. 1. In an embodiment, the processor 320 in FIG. 3 may correspond to the processor 120 in FIG. 1, the display 360 in FIG. 3 may correspond to the display device 160 in FIG. 1, and the speaker 355 in FIG. 3 may correspond to the sound output device 155 in FIG. 1.

Figure 6:
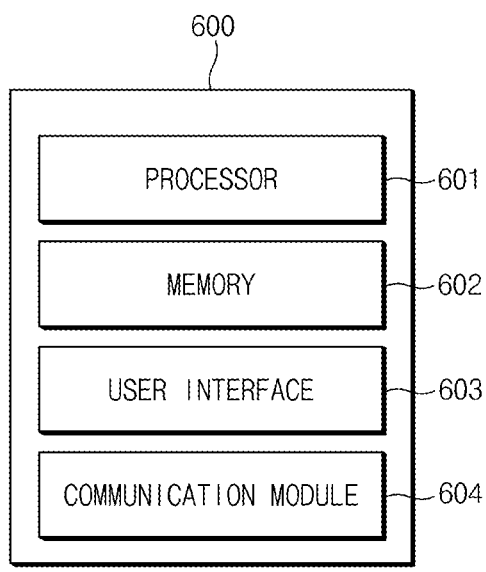
FIG. 6 is a block diagram illustrating an example configuration of an electronic device according to various embodiments.

FIG. 6 is a block diagram illustrating an example configuration of an electronic device 600 according to various embodiments. For clarity of description, descriptions duplicate with the above descriptions may be simplified or may not be repeated.

Referring to FIG. 6, the electronic device 600 may include a processor (e.g., including processing circuitry) 601 (e.g., the processor 320 in FIG. 3 and/or the processor 120 in FIG. 1), a memory 602 (e.g., the memory 130 in FIG. 1), a user interface (e.g., including interface circuitry) 603, and a communication module (e.g., including communication circuitry) 604 (e.g., the communication module 190 in FIG. 1). The user interface 603 may include a microphone (not shown) (e.g., a microphone 370 in FIG. 3 and/or the input device 150 in FIG. 1), a speaker (not shown) (e.g., the speaker 355 in FIG. 3 and/or the sound output device 155 in FIG. 1).

The electronic device 600 may further include at least one additional component in addition to the components illustrated in FIG. 6. According to an embodiment, the components of the electronic device 600 may be the same entity or may include separate entities.

The electronic device 600 may include, for example, and without limitation the smart phone, the tablet, a wearable device, a household appliance, a digital camera, or the like. According to an embodiment, the processor 601 may be operatively coupled to the communication module 604, the memory 602, and the user interface 603 (the microphone (not shown) and the speaker (not shown)) to perform overall functions of the electronic device 600. The processor 601 may include, various processing circuitry, such as, for example, and without limitation, at least one processor. The at least one processor may include, for example, and without limitation, an image signal processor (ISP), an application processor (AP), a communication processor (CP), or the like.

Figure 7:
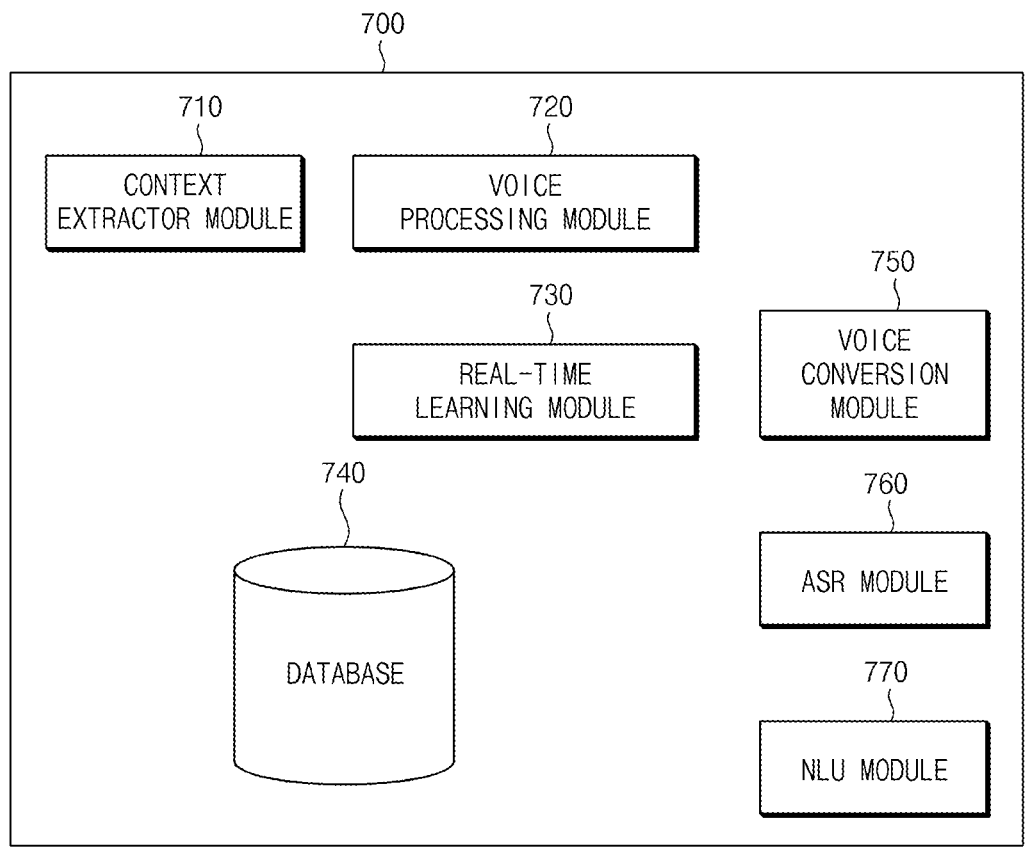
FIG. 7 is a block diagram illustrating an example configuration of an electronic device according to various embodiments.

In addition, the processor 601 may execute instructions stored in the memory 602 to drive a module (e.g., a context extractor module 710, a voice processing module 720, a real-time learning module 730, a voice conversion module 750, an ASR module 760, and/or an NLU module 770 in FIG. 7).

The processor 601 may be operatively connected to the module (e.g., the context extractor module 710, the voice processing module 720, the real-time learning module 730, the voice conversion module 750, the ASR module 760, and/or the NLU module 770 in FIG. 7) to perform the overall functions of the electronic device 600. In the embodiment disclosed in the disclosure, an operation performed (or executed) by the module (e.g., the context extractor module 710, the voice processing module 720, the real-time learning module 730, the voice conversion module 750, the ASR module 760, and/or the NLU module 770 in FIG. 7) may be understood as an operation performed by executing, by the processor 601, the instructions stored in the memory 602.

In an embodiment, the processor 601 may include the module (e.g., the context extractor module 710, the voice processing module 720, the real-time learning module 730, the voice conversion module 750, the ASR module 760, and/or the NLU module 770 in FIG. 7). In this case, an operation performed (or executed) by each module (e.g., the context extractor module 710, the voice processing module 720, the real-time learning module 730, the voice conversion module 750, the ASR module 760, and/or the NLU module 770 in FIG. 7) may be implemented with at least a portion of the processor 601.

Several modules mentioned in various embodiments of the disclosure may be implemented in hardware or may be implemented in software or any combination thereof.

The memory 602 may store a database (not shown) (e.g., a database 740 in FIG. 7) containing at least one input data. The memory 602 may store commands, information, or data associated with operations of the components included in the electronic device 600. For example, the memory 602 may store the instructions that, when executed, enable the processor 601 to perform various operations described in the disclosure.

In an embodiment, the electronic device 600 may receive the user input using the user interface 603. The user input may be an input containing the user voice signal (e.g., the utterance input of the user).

In an embodiment, the user input may be the voice input (e.g., the utterance) of the user. When the user input is the voice input, the electronic device 600 may receive the user input through the microphone (or a voice receiving device) (not shown).

In an embodiment, the user input may be a gesture input and/or the touch input. When the user input is the gesture input and/or the touch input, the electronic device 600 may receive the user input through a sensor (not shown).

According to an embodiment, the processor 601 may include a sound module (not shown). The sound module may recognize a user input for executing an operation. For example, the sound module may recognize and receive the voice signal. The sound module for recognizing the user input may have a high voice recognition rate because the sound module is strong against ambient noise, for example.

According to an embodiment, the sound module may be trained to recognize and receive the user input using an algorithm for recognizing the voice. The algorithm used to recognize the voice may be, for example, and without limitation, at least one of a hidden markov model (HMM) algorithm, an artificial neural network (ANN) algorithm, a dynamic time warping (DTW) algorithm, or the like.

According to an embodiment, the sound module may perform tasks of data purification, data integration, data reduction, and/or data conversion. The data purification may include an operation of filling in incomplete data and correcting inconsistent data. The data integration may include an operation of merging various divided databases and files to facilitate analysis. The data reduction may include an operation of sampling only some of the input data or reducing a dimension of data to be analyzed. The data conversion may include an operation of normalizing or grouping data by obtaining an average value of the data. The sound module may process the data to prevent and/or reduce a meaningless value from being contained in the data or to prevent and/or reduce deterioration of quality of the data resulted from an unintentional variable. Accuracy and timeliness may be increased through the sound module.

In an embodiment, at least one of the operations of each component described with reference to the electronic device 600 may be performed (or executed) in an external server (not shown) or another electronic device (not shown). For example, the processor 601 may transmit the user input to the external server (not shown) or another electronic device (not shown) using the communication module 604.

A processor (not shown) included in an external server or another electronic device (not shown) may receive the user input, generate response data, and transmit the response data to the electronic device 600.

The processor 601 may receive the response data corresponding to the user input from the external server 699 or another electronic device (not shown) through the communication module 604. When receiving the response data, the processor 601 may output the response data through the user interface 603. Another device may be controlled or the data may be stored through the communication module 604. The processor 601 may include the at least one processor, and may be driven by being physically divided into a main processor that performs high-performance processing and an auxiliary processor that performs low-power processing. One processor may perform both the high-performance processing and the low-power processing in a switching manner depending on a situation.

Hereinafter, the operation of the processor 601 will be described in greater detail.

In an example embodiment, an electronic device may include: a processor, and a memory operatively connected to the processor, wherein the memory stores instructions that, when executed, cause the processor to: select at least one data received through a user input, analyze the selected data, extract additional data based on the analyzed data, learn a personal voice model using the data and the additional data, and provide response data using the personal voice model.

In an example embodiment, the electronic device may further include a sound model operatively connected to the processor, the instructions, when executed, may cause the processor to receive a voice signal contained in the user input using the sound model, and the sound model may be configured to be trained using a learning algorithm.

In an example embodiment, the instructions, when executed, may cause the processor to analyze text data included in the at least one data using morphological analysis.

In an example embodiment, the instructions, when executed, may cause the processor to distinguish a substantive portion contained in the text data using the morphological analysis.

In an example embodiment, the instructions, when executed, may cause the processor to embed at least one of words, phrases, and entire sentences contained in the text to extract at least one of a word and a phrase with the greatest similarity as the additional data.

In an example embodiment, the instructions, when executed, may cause the processor to analyze image data included in the at least one data using an optical character reader.

In an example embodiment, the instructions, when executed, may cause the processor to distinguish texts and images contained in the image data from each other using the optical character reader.

In an example embodiment, the instructions, when executed, may cause the processor to embed the distinguished images to extract at least one of images with the greatest similarity as the additional data.

In an example embodiment, the personal voice model may include a personal language model and another language model, and the instructions, when executed, may cause the processor to generate the response data by adjusting a weight between the personal language model and another language model.

In an example embodiment, the instructions, when executed, may cause the processor to learn the personal language model independently of the another language model.

FIG. 7 is a block diagram illustrating an example configuration of an electronic device 700 according to various embodiments. For clarity of description, descriptions duplicate with the above descriptions may be simplified or may not be repeated.

According to an embodiment, the electronic device 700 may include the context extractor module (e.g., including various processing circuitry and/or executable program instructions) 710, the voice processing module (e.g., including various processing circuitry and/or executable program instructions) 720, the real-time learning module (e.g., including various processing circuitry and/or executable program instructions) 730, the database 740, the voice conversion module (e.g., including various processing circuitry and/or executable program instructions) 750, the ASR module (e.g., including various processing circuitry and/or executable program instructions) 760, and/or the NLU module (e.g., including various processing circuitry and/or executable program instructions) 770. The components listed above may be operatively or electrically connected to each other.

The context extractor module 710 may extract information contained in a content being displayed through a display included in or operatively connected to the electronic device 700.

In an embodiment, when a news content is being displayed through the display, the context extractor module 710 may extract information contained in the news content.

In an embodiment, when a music player content is being displayed through the display, the context extractor module 710 may extract information contained in the content.

In an embodiment, the context extractor module 710 may extract only information contained in a region selected through the user input of the content that is being displayed through the display included in or operatively connected to the electronic device 700.

In an embodiment, the context extractor module 710 may extract additional information that is not displayed through the display, but is about the content of the selected region, and provide the extracted additional information to another module (e.g., the voice processing module 720 and the real-time learning module 730).

In an embodiment, the context extractor module 710 may determine a word and/or a phrase having a high similarity with words, phrases, and/or sentences contained in the extracted information, and find the analyzed word and/or phrase from the database 740 and extract the analyzed word and/or phrase as the additional information.

In an embodiment, the context extractor module 710 may determine a word and/or a phrase with the greatest similarity by embedding the words, the phrases, and/or the sentences contained in the provided information, and find and extract the determined word and/or phrase from the database 740. The embedding may refer, for example, to a technique for expressing string data as a numeric vector. For example, the context extractor module 710 may determine the word and/or the phrase having the high similarity using word embedding that expresses the word contained in the information and/or the additional information as a dense vector.

In an embodiment, the context extractor module 710 may determine an image with a high similarity to an image contained in the extracted information, find the analyzed image from the database 740, and extract the image as the additional information.

In an embodiment, the context extractor module 710 may perform embedding on the image contained in the provided information to determine a word and/or a phrase with the greatest similarity, and find and extract the word and/or the phrase from the database 740. The embedding may refer, for example, to a technique of extracting a feature vector for the image contained in the information and/or the additional information and searching for an image similar to the feature vector. For example, the context extractor module 710 may extract the feature vector for the image contained in the information and/or the additional information using the convolutional neural network (CNN), and determine an image having a high similarity to the feature vector.

In an embodiment, the context extractor module 710 may provide the extracted information and/or additional information to another module (e.g., the voice processing module 720 and the real-time learning module 730).

For example, when a music application is being displayed on the display, the context extractor module 710 may not only extract a title of a song selected through the user input of the content displayed on the display, but also extract information (e.g., a name of a composer, a name of a lyricist, an album containing the song), which is, although not displayed through the display, about the displayed song, as the additional information, and provide the extracted information to another module.

In an embodiment, the context extractor module 710 may provide the extracted information to another module in a form of a text array.

In an embodiment, the context extractor module 710 may convert (e.g., into a byte array form) the image as well as the text and provide the same to another module.

In an embodiment, the context extractor module 710 may provide the information extracted in the form of the text array to the voice processing module 720 for synchronization thereto to the ASR module 760.

Although the context extractor module 710 is separately illustrated in FIG. 7, this is merely illustrative and the disclosure is not limited thereto. For example, the context extractor module may be included in the application.

Although the voice processing module 720, the real-time learning module 730, and the voice conversion module 750 are separately illustrated in FIG. 7, the context extractor module 710 may include the voice processing module 720, the real-time learning module 730, and the voice conversion module 750.

The voice processing module 720 may convert the utterance of the user into a database form such that the real-time learning module 730 may analyze the user utterance.

The voice processing module 720 may divide the utterance of the user into at least one sequence based on the information and/or the additional information extracted from the context extractor module 710 to analyze the utterance of the user.

The voice processing module 720 may use an NL result (e.g., a capsule, a goal, and a signal) of the utterance as a component (an element) that may be expressed in one sequence.

The information received from the voice processing module 720 may be learned for use in recognition using the ASR module. In an embodiment, the real-time learning module 730 may generate a language model in real time. The real-time learning module 730 may generate a personal language model (a personal neural model) together with an external language model (an external neural model).

In an embodiment, the real-time learning module 730 may learn the information and/or the additional information provided from the voice processing module 720 through the personal language model (the personal neural model). The electronic device 700 may provide an optimized language model to the user through the learning using the personal language model (the personal neural model).

In an embodiment, the real-time learning module 730 may generate the language model to recognize a sentence by adjusting weights of the external language model (the external neural model) and the personal language model (the personal neural model). For example, when recognizing a sentence about the provided context information and/or additional information, the real-time learning module 730 may increase the weight of the personal language model to adjust the weight to recognize the sentence related to the provided context information.

In an embodiment, the electronic device 700 may generate the language model using the artificial intelligence (AI). The artificial intelligence system may be the rule-based system, and may be the neural network-based system (e.g., the feedforward neural network (FNN) and/or the recurrent neural network (RNN)). The artificial intelligence system may be the combination of the systems described above or another artificial intelligence system.

The ASR module 760 may convert the received user input into the text data. For example, the ASR module 760 may convert the received voice data into the text data.

In an embodiment, the information changed into the text form may be in the form of the natural language utterance. In an embodiment, the voice conversion module 750 may change the information in the text form into the information in the voice form.

The NLU module 770 may identify the intention of the user by performing the syntactic analysis or the semantic analysis. The NLU module 770 of an embodiment may identify the meaning of the word extracted from the voice input using the linguistic features (e.g., the grammatical elements) of the morpheme or the phrase, and determine the intention of the user by matching the identified meaning of the word with the intention.

According to an embodiment according to the disclosure, a voice assistant function customized to each user may be provided through real-time learning using the personal language model.

Hereinafter, a method of learning using the personal language model (the personal neural model) will be described in greater detail with reference to FIGS. 8, 9, 10, 11, 12 and 13.

Figure 8:
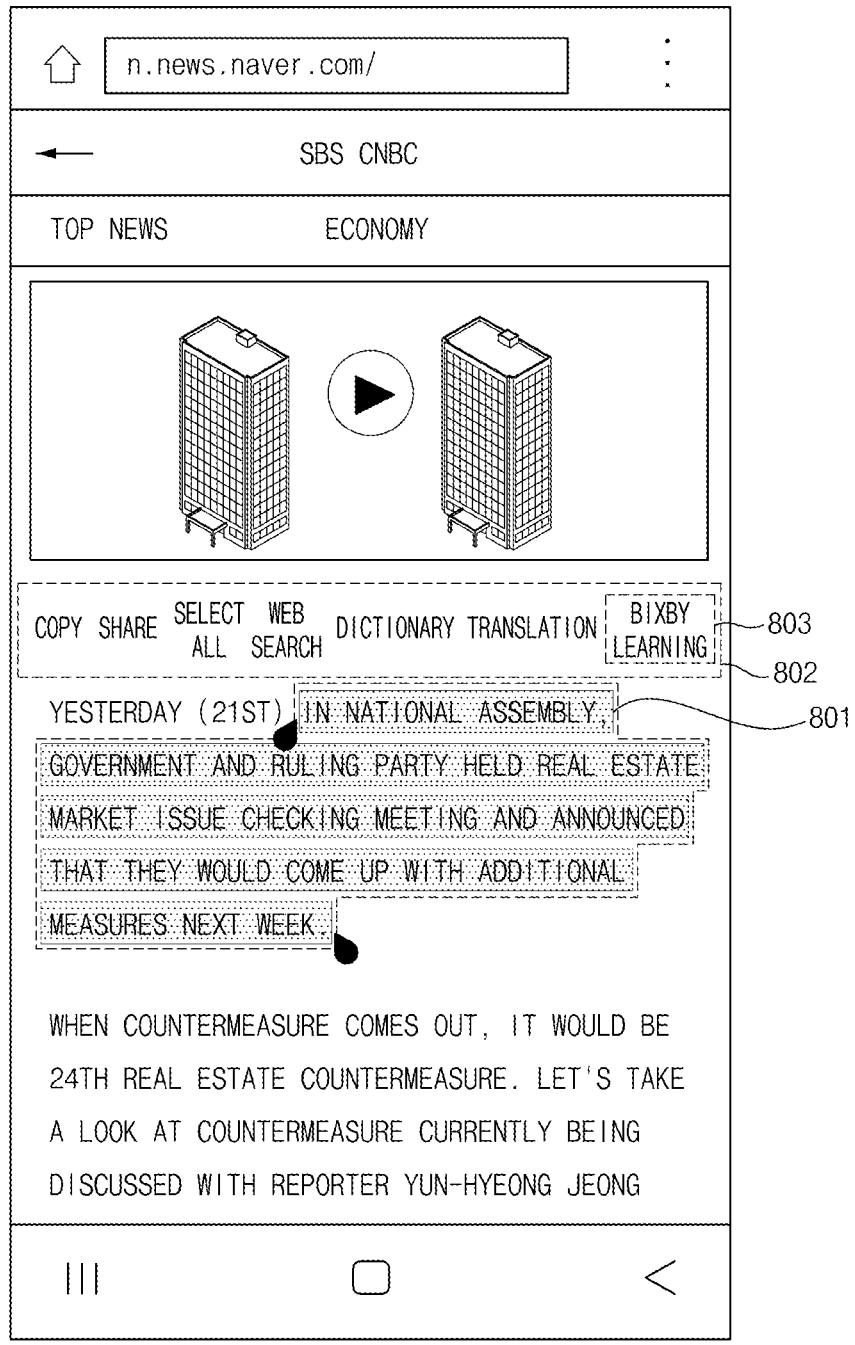
FIG. 8 is a diagram illustrating an example method for extracting information using a long drag or a long press as a user input, according to various embodiments.

FIG. 8 is a diagram illustrating an example method for extracting information using a long drag or a long press as a user input, according to various embodiments. For clarity of description, descriptions duplicate with the above descriptions may be simplified or may not be repeated.

FIG. 8 illustrates a screen on which web news is displayed through the electronic device display. Referring to FIG. 8, the electronic device 101 may receive, as the user input, the long drag or the long press for a region 801 in which a portion of the news displayed through the display is selected.

For example, as shown in FIG. 8, the electronic device 101 may receive, as the user input, the long drag or the long press for the region 801 marked as 'In the National Assembly, the government and the ruling party held a real estate market issue checking meeting and announced that they would come up with additional measures next week.'.

In an embodiment, the electronic device 101 may display a hidden menu 802 through the display in response to the user input. The electronic device 101 may display a voice assistant learning (e.g., Bixby learning 803) in the hidden menu 802 through the display.

For example, as shown in FIG. 8, the electronic device 101 may include the Bixby learning 803 in the hidden menu 802 and display the Bixby learning 803 through the display.

In an embodiment, the electronic device 101 may receive a user input of selecting the voice assistant learning 803 included in the hidden menu 802. When the user input of selecting the voice assistant learning 803 is received, the electronic device 101 may extract information about the selected region 801 and learn the extracted information. This will be described in greater detail below with reference to FIGS. 9 and 10.

FIG. 9 is a diagram illustrating an example method for analyzing extracted information according to various embodiments. For clarity of description, descriptions duplicate with the above descriptions may be simplified or may not be repeated. The example may be described with reference to FIG. 8 as well.

In an embodiment, the electronic device 101 may distinguish a speech 901 from the extracted information (e.g., the selected region 801 in FIG. 8) through morphological analysis, and further analyze a part-of-speech 902. For example, the electronic device 101 may divide the extracted information (e.g., the selected region 801 in FIG. 8) into a substantive (e.g., a substantive portion) 903, a modifier 904, a postposition 905, an interjection 906, and a predicate 907 through, for example, the morphological analysis.

For example, referring to FIG. 9, the substantive 903 may include a noun, a pronoun, and a numeral. The modifier 904 may include a determiner and an adverb. The postposition 905 may include an auxiliary word. The interjection 906 may include an exclamation. The predicate 907 may include a verb and an adjective.

In an embodiment, the electronic device 101 may extract related words through database search for the substantive portion extracted through the morphological analysis. This will be described in greater detail below with reference to FIG. 10.

FIG. 10 is a diagram illustrating an example method for analyzing extracted information and extracting additional information, according to various embodiments. For clarity of description, descriptions duplicate with the above descriptions may be simplified or may not be repeated.

Referring to FIG. 10, the electronic device 101 may receive a text 1001 of 'In the National Assembly, the government and the ruling party held a real estate market issue checking meeting and announced that they would come up with additional measures next week.' through the user input. The electronic device 101 may analyze the received text 1001.

As a result of the analysis, the electronic device 101 may analyze the text 1001 of 'In the National Assembly, the government and the ruling party held a real estate market issue checking meeting and announced that they would come up with additional measures next week.' to extract a 'National Assembly' 1011, a 'government' 1012, a 'ruling party' 1013, a 'real estate' 1014, a 'real estate market' 1015, a 'real estate market issue' 1016, and an 'additional measures' 1017.

In an embodiment, the electronic device 101 may extract the information based on the user input of selecting the voice assistant learning (e.g., the Bixby learning 803 in FIG. 8) included in the hidden menu (e.g., the hidden menu 802 in FIG. 8). For example, the electronic device 101 may receive the user input of selecting the voice assistant learning (e.g., the Bixby learning 803 in FIG. 8) in a state in which the text 1001 of 'In the National Assembly, the government and the ruling party held a real estate market issue checking meeting and announced that they would come up with additional measures next week.' is selected. The electronic device 101 may analyze the 'In the National Assembly, the government and the ruling party held a real estate market issue checking meeting and announced that they would come up with additional measures next week.' 1001 to extract the 'National Assembly' 1011, the 'government' 1012, the 'ruling party' 1013, the 'real estate' 1014, the 'real estate market' 1015, the 'real estate market issue' 1016, and the 'additional measures' 1017.

In an embodiment, the electronic device 101 may analyze the selected text using the morphological analysis. For example, the electronic device 101 may distinguish a speech from the extracted information through the morphological analysis, and further analyze a part-of-speech to extract information. In an embodiment, the electronic device 101 may extract the related words through the database search for the substantive portion extracted through the morphological analysis.

In an embodiment, the electronic device 101 may perform the embedding on the word included in the substantive portion to find a word with the greatest similarity from a dictionary and extract the found word as recommended information.

Referring to FIG. 10, the electronic device 101 may perform the morphological analysis on the 'In the National Assembly, the government and the ruling party held a real estate market issue checking meeting and announced that they would come up with additional measures next week.' 1001 to extract the substantive portions of the 'National Assembly' 1011, the 'government' 1012, the 'ruling party' 1013, the 'real estate' 1014, the 'real estate market' 1015, the 'real estate market issue' 1016, and the 'additional measures' 1017.

When the electronic device 101 embeds the 'National Assembly' 1011, the 'government' 1012, the 'ruling party' 1013, the 'real estate' 1014, the 'real estate market' 1015, the 'real estate market issue' 1016, and the 'additional measures' 1017, a similarity value obtained using a similarity measure such as, for example, and without limitation, an Euclidian distance or a cosine similarity, may appear high in a 'chairman of the National Assembly' 1021, a 'National Assembly composition ratio' 1022, a 'Democratic Party of Korea' 1023, a 'trade trend' 1024, a 'real estate market price' 1025, and a 'Minister of Land, Infrastructure and Transport' 1026 that are embedded.

The electronic device 101 may use the similarity value to extract the 'chairman of the National Assembly' 1021, the 'National Assembly composition ratio' 1022, the 'Democratic Party of Korea' 1023, the 'trade trend' 1024, the 'real estate market price' 1025, and the 'Minister of Land, Infrastructure and Transport' 1026 as the additional information through the database search.

In an embodiment, the electronic device 101 may learn the extracted information and additional information using the personal language model.

In an embodiment, the electronic device 101 may perform decoding using the learned personal language model. This will be described in greater detail below with reference to FIG. 14.

Hereinafter, a method for analyzing, by the electronic device 101, the image to learn the personal voice model according to an embodiment of the disclosure will be described in greater detail below with reference to FIGS. 11 and 12.

Figure 11:
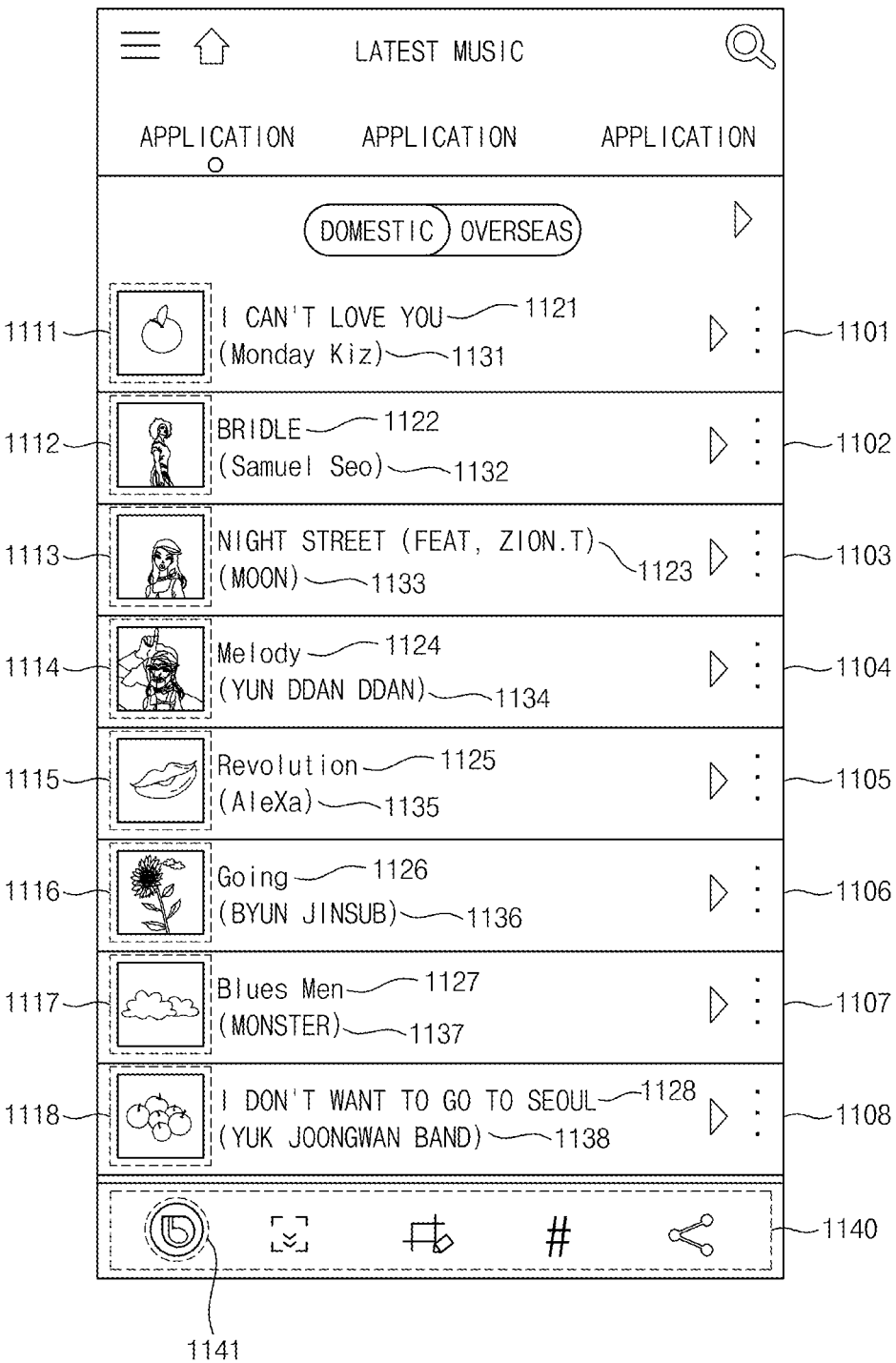
FIG. 11 is a diagram illustrating an example method for extracting information in response to a user input of capturing a display being displayed on an electronic device, according to various embodiments.

FIG. 11 is a diagram illustrating an example method for extracting information in response to a user input of capturing a display being displayed on an electronic device, according to various embodiments. For clarity of description, descriptions duplicate with the above descriptions may be simplified or may not be repeated.

FIG. 11 illustrates an example screen on which a music playback application is displayed through the electronic device display. Referring to FIG. 11, the electronic device 101 may receive, as the user input, an input of capturing the screen on which the music playback application is displayed through the display.

In an embodiment, the electronic device 101 may display the hidden menu 1140 through the display in response to the user input. The electronic device 101 may display a voice assistant learning 1141 in the hidden menu 1140 through the display.

For example, as shown in FIG. 11, the electronic device 101 may include the Bixby learning 1141 in the hidden menu 1140 and display the Bixby learning 1141 through the display.

In an embodiment, the electronic device 101 may receive a user input of selecting the voice assistant learning 1141 included in the hidden menu 1140. When the user input of selecting the voice assistant learning 1141 is received, the electronic device 101 may extract information about the captured screen and learn the extracted information.

In an embodiment, the electronic device 101 may extract the information about the captured screen using an optical character reader.

Referring to FIG. 11, the electronic device 101 may recognize information about music 1101, 1102, 1103, 1104, 1105, 1106, 1107, and 1108 included in a play list displayed on the screen using the optical character reader.

For example, the electronic device 101 may recognize the information about the music included in the play list using the optical character reader, and extract the information by classifying the information into image information (e.g., images of albums 1111, 1112, 1113, 1114, 1115, 1116, 1117, and 1118 in which the music is included) and text information (e.g., titles of the music 1121, 1122, 1123, 1124, 1125, 1126, 1127, and 1128, singer names of the music 1131, 1132, 1133, 1134, 1135, 1136, 1137, and 1138).

In an embodiment, the electronic device 101 may learn the extracted information when the user input of selecting the voice assistant learning 1141 is received. Because the method for the electronic device 101 to learn the text contained in the extracted information has been described in detail above with reference to FIGS. 8, 9 and 10, a duplicate description may not be repeated. Hereinafter, a method for the electronic device 101 to learn the image will be described in greater detail below with reference to FIG. 12.

FIG. 12 is a diagram illustrating an example method for analyzing extracted image information and extracting additional information, according to various embodiments. For clarity of description, descriptions duplicate with the above descriptions may be simplified or may not be repeated.

Referring to FIG. 12, the electronic device 101 may receive an album image 1201 through the user input. The electronic device 101 may analyze the received album image 1201.

In an embodiment, the electronic device 101 may analyze the album image 1201 using, for example, the CNN neural network. In an embodiment, the electronic device 101 may extract an 'album name' 1211, a 'singer name' 1212, and a 'song recorded in the album' 1213 of the album image 1201 as a result of the analysis.

In an embodiment, the electronic device 101 may embed the album image 1201 to find an image of another album with a similarity to extract an 'album name', a 'singer name', and a 'song recorded in the album' of another album image as the additional information.

In an embodiment, the electronic device 101 may embed the extracted word to find a word with the greatest similarity from the dictionary and extract the found word as the recommended information.

For example, the electronic device 101 may extract, as the additional information, an 'another album of the same period' 1221, a 'different song by the same singer' 1222, and a 'different song featured by the same singer' 1223, which show high similarity values obtained using the similarity measure such as the Euclidian distance or the cosine similarity with a result of embedding the 'album name' 1211, the 'singer name' 1212, and the 'song recorded in the album' 1213, which is the analysis result.

In an embodiment, the electronic device 101 may learn the personal language model using the extracted information and additional information.

In an embodiment, the electronic device 101 may perform the decoding using the learned personal language model. This will be described in greater detail below with reference to FIG. 14.

Figure 13:
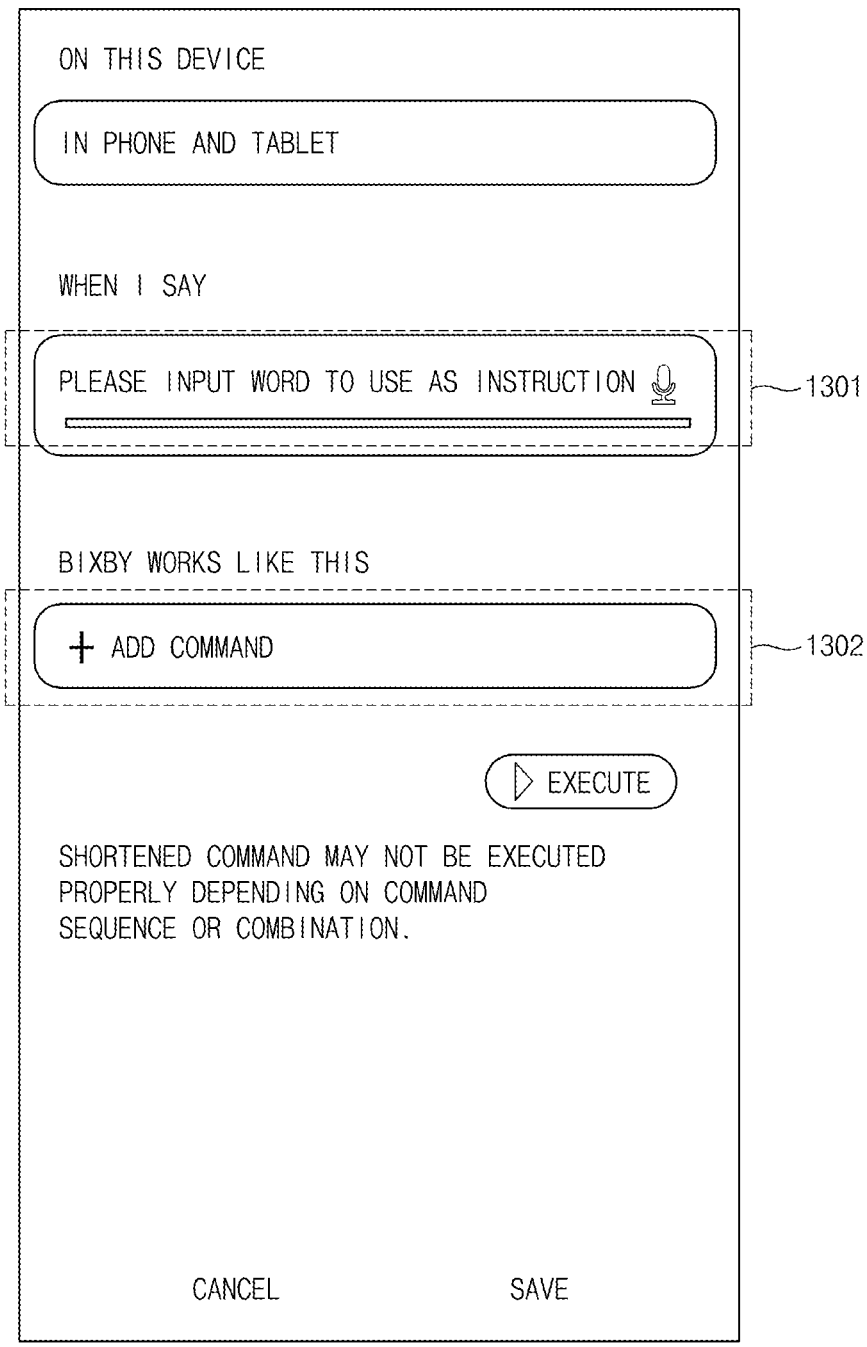
FIG. 13 is a diagram illustrating an example method for extracting information in response to a user input in which a user inputs information desired to be learned to an electronic device, according to various embodiments.

FIG. 13 is a diagram illustrating an example method for extracting information in response to a user input in which a user inputs information desired to be learned to an electronic device, according to various embodiments. For clarity of description, descriptions duplicate with the above descriptions may be simplified or may not be repeated.

FIG. 13 illustrates an example screen through which the user is able to provide the input through the electronic device display. Referring to FIG. 13, the electronic device 101 may receive a command desired by the user as the user input through a first region 1301. When receiving the input displayed in the first region 1301 through a second region 1302, the electronic device 101 may receive an operation to be performed as the user input.

In an embodiment, the electronic device 101 may recommend an operation to be added in the second region 1302 with respect to the command input to the first region 1301.

In an embodiment, the electronic device 101 may extract information about the user input received through the first region 1301 and/or the second region 1302, and extract additional information using the extracted information.

In an embodiment, the electronic device 101 may learn the personal language model using the extracted information and additional information.

In an embodiment, the electronic device 101 may perform the decoding using the learned personal language model. This will be described in greater detail below with reference to FIG. 14.

Figure 14:
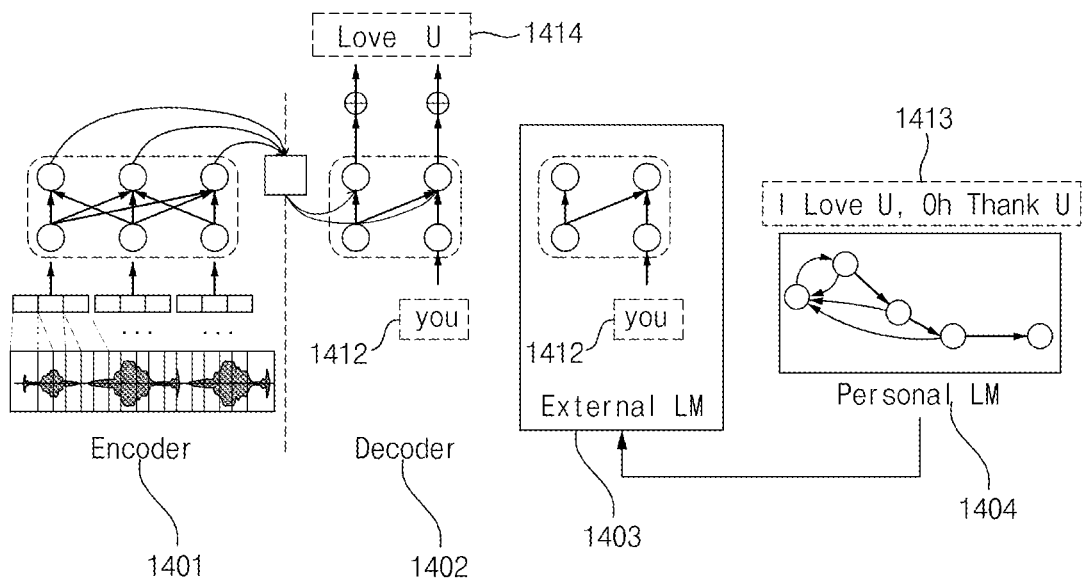
FIG. 14 is a diagram illustrating an example method for an electronic device to provide response data using a personal voice model, according to various embodiments.

FIG. 14 is a diagram illustrating an example method for an electronic device to provide response data using a personal voice model, according to various embodiments.

According to an embodiment illustrated in FIG. 14, the electronic device 101 or the personal voice model of the electronic device 101 may include an encoder 1401, a decoder 1402, an external language model (e.g., including various processing circuitry and/or executable program instructions) 1403, and a personal language model (e.g., including various processing circuitry and/or executable program instructions) 1404. The components listed above may be operatively or electrically connected to each other.

In an embodiment, the decoder 1402 may generate the response data learned using the encoder 1401. Although shown separately in FIG. 14, the decoder 1402 may include the external language model 1403 and the personal language model 1404.

In an embodiment, the decoder 1402 may generate the response data by adjusting weights of the external language model 1403 and the personal language model 1404.

For example, as shown in FIG. 14, the decoder 1402 may adjust the weight of the personal language model 1404 to be high with respect to a 'you' 1412, which is a learning result of the external language model 1403, and an 'I love U, Oh Thank U' 1413, which is a learning result of the personal language model 1404.

By adjusting the weight of the personal language model 1404 to be high, the decoder 1402 may provide a 'Love U' 1414 including U, not the 'you' 1412, as the response data.

The 'I love U, Oh Thank U' 1413, which is the learning result of the personal language model 1404, may indicate that the user of the electronic device 101 prefers to write with 'U' rather than 'you' when using 'Love U' or 'Thank U'.

Therefore, the decoder 1402 may provide customized response data reflecting the preference of the user by providing the 'Love U' 1414 including 'U', not the 'you' 1412 as the response data.

Hereinafter, a method performed by the electronic device 101 according to an embodiment disclosed in the disclosure will be described in greater detail below with reference to FIG. 15.

Figure 15:
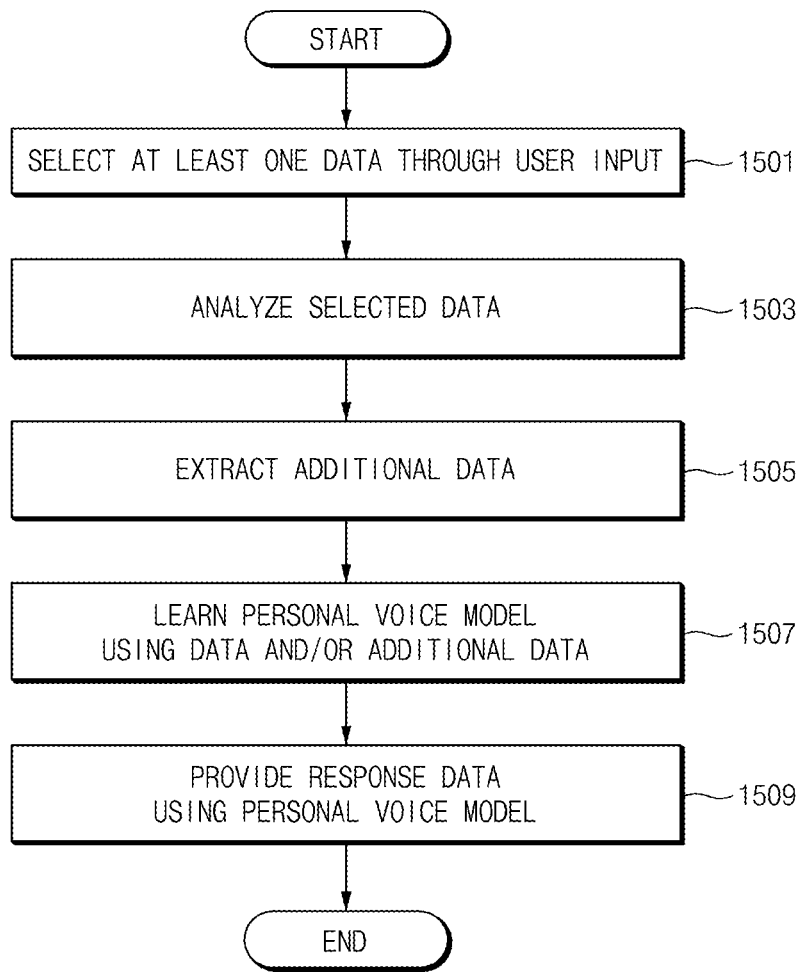
FIG. 15 is a flowchart illustrating an example method for an electronic device to provide response data using a personal voice model, according to various embodiments.

FIG. 15 is a flowchart 1500 illustrating an example method for an electronic device to provide response data using a personal voice model, according to various embodiments. According to an embodiment, a process illustrated in FIG. 15 may be understood to be performed as the processor (e.g., the processor 120 in FIG. 1) of the electronic device (e.g., the electronic device 101 in FIG. 1) executes the instructions stored in the memory (e.g., the memory 130 in FIG. 1). For clarity of description, descriptions duplicate with the above descriptions may be simplified or may not be repeated.

In operation 1501, the electronic device 101 may select the at least one data through the user input.

In an embodiment, the electronic device 101 may receive the user input using the user interface. The user input may be the input containing the user voice signal (e.g., the utterance input of the user).

In an embodiment, the user input may be the voice input (e.g., the utterance) of the user. When the user input is the voice input, the electronic device 101 may receive the user input through the microphone (or the voice receiving device) (e.g., the input module 150 in FIG. 1).

In an embodiment, the user input may be a touch input of uploading a file containing the voice of the user. When the user input is the touch input, the electronic device 101 may receive the user input through the touch sensor.

In an embodiment, the user input may include the user input of selecting the text included in the screen displayed on the display of the electronic device.

In an embodiment, the user input may include the user input of capturing the screen currently displayed on the display of the electronic device.

In operation 1503, the electronic device 101 may analyze the selected data. The selected data may contain the text and/or the image.

In an embodiment, the electronic device 101 may analyze the selected data using the morphological analysis. For example, the electronic device 101 may analyze the selected data by classifying parts-of-speech of words contained in a sentence contained in the selected data using the morphological analysis.

In an embodiment, the electronic device 101 may analyze the selected data using the optical character reader. For example, the electronic device 101 may analyze the selected data by dividing the data into the information about the image and the information about the text using the optical character reader.

In operation 1505, the electronic device 101 may extract the additional data.

In an embodiment, the electronic device 101 may determine the word and/or the phrase with the greatest similarity by embedding the words, the phrases, and/or the sentences contained in the data, and find and extract the additional data from the database. The embedding may refer, for example, to the technique for expressing the string data as the numeric vector. For example, the electronic device 101 may determine the word and/or the phrase having the high similarity using the word embedding that expresses the word contained in the information and/or the additional information as the dense vector.

In an embodiment, the electronic device 101 may determine the image with the high similarity to the image contained in the extracted information, find the analyzed image from the database, and extract the image as the additional information. For example, the electronic device 101 may extract the feature vector for the image contained in the information and/or the additional information using the convolutional neural network (CNN), and determine the image having the high similarity to the feature vector.

In operation 1507, the electronic device 101 may learn the personal voice model using the data and/or the additional data.

In an embodiment, the electronic device 101 may generate the language model to recognize the sentence by adjusting the weights of the external language model (the external neural model) and the personal language model (the personal neural model). For example, when recognizing the sentence about the provided data and/or additional data, the electronic device 101 may increase the weight of the personal language model to adjust the weight to recognize the sentence related to the provided data.

In an embodiment, the electronic device 101 may generate the language model using the artificial intelligence (AI). The artificial intelligence system may be the rule-based system, and may be the neural network-based system (e.g., the feedforward neural network (FNN) and/or the recurrent neural network (RNN)). The artificial intelligence system may be the combination of the systems described above or another artificial intelligence system.

In operation 1509, the electronic device 101 may provide the response data using the personal voice model. The response data may refer, for example, to data containing at least one shortened command name. The electronic device 101 may provide the response data containing the at least one shortened command name to the user using an output device (e.g., the display and the speaker) included in or operatively connected to the electronic device 101.

In an embodiment, the electronic device 101 may transform the response data containing the shortened command name in the text form into voice data using the TTS module. The electronic device 101 (and/or the processor (not shown)) may output the response data transformed into the voice data through the speaker (not shown).

FIG. 15 illustrates that the electronic device 101 sequentially performs operations 1501 to 1509, but this is merely illustrative. The operations may be performed simultaneously, or some of the operations may be performed by the electronic device 101 and the remaining operations may be changed to be performed by the external device. For example, operation 1501 may be changed to be performed by the electronic device 101 and operations 1503 to operation 1509 may be performed by the server.

In an example embodiment, a method performed by an electronic device may include: selecting at least one data received through a user input based on a process for a memory included in the electronic device or connected to the electronic device being executed, analyzing the selected data, extracting additional data based on the analyzed data, learning a personal voice model using the data and the additional data, and providing response data using the personal voice model.

In an example embodiment, the method may further include receiving a voice signal contained in the user input using a sound model included in the electronic device or operatively connected to the electronic device, and training the sound model using a learning algorithm.

In an example embodiment, the method may further include analyzing text data included in the at least one data using morphological analysis.

In an example embodiment, the method may further include distinguishing a substantive portion contained in the text data using the morphological analysis.

In an example embodiment, the method may further include embedding at least one of words, phrases, and entire sentences contained in the text to extract at least one of a word and a phrase with the greatest similarity as the additional data.

In an example embodiment, the method may further include analyzing image data included in the at least one data using an optical character reader.

In an example embodiment, the method may further include distinguishing texts and images contained in the image data from each other using the optical character reader.

In an example embodiment, the method may further include embedding the distinguished images to extract at least one of images with the greatest similarity as the additional data.

In an example embodiment, the personal voice model may include a personal language model and another language model, and the method may further include generating the response data by adjusting a weight between the personal language model and another language model.

In an example embodiment, the method may further include learning the personal language model independently of the another language model.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a processor; and
   a memory operatively connected to the processor,
   wherein the memory stores instructions that, when executed, cause the processor to:
   select at least one data received through a user input;
   analyze text data included in the selected at least one data using morphological analysis;
   identify a substantive portion contained in the text data using the morphological analysis;
   embed the identified substantive portion contained in the text data;
   extract additional data including at least one of a word and a phrase having a greatest similarity with the identified substantive portion;
   learn an external language model using the selected at least one data;
   learn a personal language model using the selected at least one data and the additional data;
   adjust a first weight value for a learning result of the personal language model to be higher than a second weight value for a learning result of the external language model, based on the additional data being extracted; and
   provide response data using the learning result of the personal language model based on the adjusted first weight value.

2. The electronic device of claim 1, further comprising:
   wherein the instructions, when executed, cause the processor to process a voice signal contained in the user input using a sound model to extract the text data.

3. The electronic device of claim 1, wherein the instructions, when executed, cause the processor to analyze image data included in the selected at least one data using an optical character reader.

4. The electronic device of claim 3, wherein the instructions, when executed, cause the processor to distinguish texts and images contained in the image data from each other using the optical character reader.

5. The electronic device of claim 4, wherein the instructions, when executed, cause the processor to embed the distinguished images to extract at least one of images with a greatest similarity as the additional data.

6. The electronic device of claim 1, wherein the instructions, when executed, cause the processor to learn the personal language model independently from the external language model.

7. A method performed by an electronic device, the method comprising:
   selecting at least one data received through a user input;
   analyzing text data included in the selected at least one data using morphological analysis;
   identifying a substantive portion contained in the text data using the morphological analysis;
   embedding the identified substantive portion contained in the text data;
   extracting additional data including at least one of a word and a phrase having a greatest similarity with the identified substantive portion;
   learning an external language model using the selected at least one data;
   learning a personal language model using the selected at least one data and the additional data;

adjusting a first weight value for a learning result of the personal language model to be higher than a second weight value for a learning result of the external language model, based on the additional data being extracted; and providing response data using the learning result of the personal language model based on the adjusted first weight value.

8. The method of claim 7, further comprising:

receiving a voice signal contained in the user input using a sound model included in the electronic device; and training the sound model using a learning algorithm.

9. The method of claim 7, further comprising:

analyzing image data included in the selected at least one data using an optical character reader.

10. The method of claim 9, further comprising:

distinguishing texts and images contained in the image data from each other using the optical character reader.

11. The method of claim 10, further comprising:

embedding the distinguished images to extract at least one of images with a greatest similarity as the additional data.

12. The method of claim 7, further comprising: learning the personal language model independently from the external language model.

* * * * *